US011673643B2

(12) United States Patent
Markley et al.

(10) Patent No.: US 11,673,643 B2
(45) Date of Patent: Jun. 13, 2023

(54) LOW STALL OR MINIMUM CONTROL SPEED AIRCRAFT

(71) Applicant: JP AEROSPACE GROUP, INC., Wilmington, DE (US)

(72) Inventors: John K. Markley, Center Harbor, NH (US); Jason Russell, Melbourne, FL (US); Paul Bartlett, Melbourne, FL (US)

(73) Assignee: JP AEROSPACE GROUP, INC., Wilmington, DE (US)

(*) Notice: Subject to any disclaimer, the term of this patent is extended or adjusted under 35 U.S.C. 154(b) by 552 days.

(21) Appl. No.: 16/062,973

(22) PCT Filed: Mar. 23, 2017

(86) PCT No.: PCT/US2017/023919
§ 371 (c)(1),
(2) Date: Jun. 15, 2018

(87) PCT Pub. No.: WO2018/009253
PCT Pub. Date: Jan. 11, 2018

(65) Prior Publication Data

US 2019/0002076 A1 Jan. 3, 2019

Related U.S. Application Data

(60) Provisional application No. 62/312,410, filed on Mar. 23, 2016.

(51) Int. Cl.
*B64C 1/00* (2006.01)
*B64C 5/02* (2006.01)
(Continued)

(52) U.S. Cl.
CPC .............. *B64C 1/0009* (2013.01); *B64C 3/14* (2013.01); *B64C 3/50* (2013.01); *B64C 5/02* (2013.01);
(Continued)

(58) Field of Classification Search
CPC ........... B64C 1/0009; B64C 3/14; B64C 5/02; B64C 9/20; B64C 39/04
(Continued)

(56) References Cited

U.S. PATENT DOCUMENTS 2,031,876 A * 2/1936 Burnelli .................. B64C 39/04 244/36
2,140,783 A * 12/1938 Bellanca ................. B64C 39/04 244/13
(Continued)

FOREIGN PATENT DOCUMENTS

EP 2851284 A1 * 3/2015 ............. B64C 13/26
GN 28625/35 8/1936

OTHER PUBLICATIONS

International Search Report, dated Dec. 19, 2017, ISA/US, Alexandria, Virginia, United States.

*Primary Examiner* — Assres H Woldemaryam
(74) *Attorney, Agent, or Firm* — Lowndes; Stephen C. Thomas

(57) ABSTRACT

A low stall or minimum control speed aircraft comprising a fuselage that has vertically flat sides; wings with high a lift airfoil profile of constant chord section set at zero degree planform sweep, twin booms having inner vertically flat surfaces, twin vertical stabilizers, a flying horizontal stabilizer; preferably twin engines having propellers and wherein each engine preferably has a thrust-line that is inclined nose-up to a maximum of +8 degrees, and is parallel to the wing chord underneath wing mounts and landing gear doors that provide surfaces for channeling propeller wash in a
(Continued)

175
100
130b,101b
101a,130a
103a
001
103b
10A,B
J
J'
11A,B
13A,B
105a
105b
S
11A,B
13A,B
182b
P
Q
10A,B
130a
124
181a
181b
WING
OUTER
PORTION
182a
124
130b
123
WING
INNER
PORTION
K
123 rearward direction; all working in concert so that the airplane has an extremely low stall speed and minimum control speed. The engines may be diesel, hydrogen fuel cell, electric fuel cell, diesel-electric, gas turbine or combinations thereof. The propellers may be counter-rotating.

12 Claims, 15 Drawing Sheets

(51) Int. Cl.
*B64C 39/04* (2006.01)
*B64C 9/20* (2006.01)
*B64C 3/50* (2006.01)
*B64C 3/14* (2006.01)
*B64C 5/06* (2006.01)
*B64C 25/00* (2006.01)
*B64C 9/00* (2006.01)

(52) U.S. Cl.
CPC .................. *B64C 5/06* (2013.01); *B64C 9/20* (2013.01); *B64C 39/04* (2013.01); *B64C 2001/0045* (2013.01); *B64C 2009/005* (2013.01); *B64C 2025/003* (2013.01)

(58) Field of Classification Search
USPC .......................................................... 244/216
See application file for complete search history.

(56) References Cited

U.S. PATENT DOCUMENTS

D120,187 S * 4/1940 Silverstein ................ B64C 3/16 D12/335
2,224,641 A * 12/1940 Burnelli .................. B64C 39/04 244/36
RE22,029 E * 2/1942 Nebesar .................. B64C 39/04 D12/335
2,410,234 A 10/1946 Read et al.
2,449,104 A 9/1948 Burcham
2,685,420 A * 8/1954 Burnelli .................. B64C 25/14 244/13
2,971,792 A * 2/1961 Steinmetz ................ B64D 1/06 294/82.26
2,974,899 A 3/1961 Fowler
3,012,737 A 12/1961 Dodd
3,012,740 A 12/1961 Wagner
3,018,987 A 1/1962 Multhopp
3,026,067 A 3/1962 Grant
3,223,356 A * 12/1965 Alvarez-Calderon ....................... B64C 29/0016 244/13
3,312,426 A 4/1967 Fowler
3,345,015 A 10/1967 Ljungstrom
3,393,883 A * 7/1968 Smith ..................... B64C 25/12 244/102 R
3,419,232 A * 12/1968 McStay ................... B64C 23/06 244/119
3,608,850 A 9/1971 Fredericks
3,652,035 A 3/1972 Fredericks
3,767,140 A 10/1973 Johnson
3,884,432 A 5/1975 Blanchard, Jr. et al.
3,938,760 A 2/1976 Hoppner et al.
3,977,630 A 8/1976 Lewis et al.
4,238,094 A 12/1980 McGann
4,301,980 A 12/1981 Bradfield et al.
4,343,446 A 8/1982 Langley
4,449,679 A * 5/1984 McComas ................. B64C 1/22 244/118.2
4,478,378 A 10/1984 Capuani
4,784,355 A 11/1988 Brine
5,071,088 A 12/1991 Betts
5,098,034 A 3/1992 Lendriet
5,141,176 A * 8/1992 Kress .................. B64C 29/0033 244/66
5,145,129 A 9/1992 Gebhard
5,167,383 A 12/1992 Nozaki
5,395,073 A 3/1995 Rutan et al.
5,454,531 A 10/1995 Melkuti
5,758,844 A 6/1998 Cummings
5,979,824 A 9/1999 Gagliano et al.
6,016,992 A 1/2000 Kolacny
6,158,540 A * 12/2000 Rice ........................ B60V 1/04 180/117
6,264,136 B1 7/2001 Weston
7,367,532 B2 5/2008 Libby
8,523,101 B2 9/2013 Cazals et al.
8,752,788 B2 * 6/2014 Tuval ...................... B64C 39/04 244/34 A
2003/0094537 A1 * 5/2003 Austen-Brown ... B64C 29/0033 244/7 R
2005/0103944 A1 5/2005 Greenblatt
2006/0108472 A1 5/2006 Clark
2010/0096497 A1 * 4/2010 Macgregor ............... B64C 9/02 244/87
2011/0108675 A1 5/2011 Tuval
2011/0127385 A1 * 6/2011 Morris ...................... B64C 9/26 244/216
2011/0127387 A1 * 6/2011 Morris ...................... B64C 9/26 244/216
2012/0280089 A1 11/2012 Keller
2013/0075538 A1 * 3/2013 Wiplinger ............... B64C 25/54 244/102 R
2013/0153708 A1 6/2013 Brunken, Jr.
2018/0162525 A1 * 6/2018 St. Clair ............. B64C 29/0025

* cited by examiner 113a
001
123
114a
124
124
Q
101a
100

175
109a, 109b
125a, 125b
123
124
400
136b
136a
191b,c
191a
001
100

LOW STALL OR MINIMUM CONTROL SPEED AIRCRAFT

CROSS REFERENCE TO RELATED APPLICATIONS AND INCORPORATION BY REFERENCE

This international patent application, filed under the Patent Cooperation Treaty (PCT), claims benefit of priority to U.S. provisional patent application No. 62/312,410, filed in the United States Patent and Trademark Office (USPTO) on 23 Mar. 2016, titled LOW STALL OR MINIMUM CONTROL SPEED AIRCRAFT, which is herein incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to short take-off and landing aircraft usable as manned or unmanned air vehicles; aircraft suitable for landing on ships or other vehicles; or the field of aircraft generally characterized as having a low stall or minimum control speed.

2. Background

Low stall speed is desirable in an aircraft because low speed aircraft require shorter runways, increasing the number of potential sites that can be utilized for takeoff and landing, and thus increasing the usefulness of the airplane. This attribute is desirable in both manned and unmanned aircraft.

There are many applications in which a short takeoff and landing aircraft may have application. For example, many airports, and especially hub airports, are currently operated at or near capacity, thus creating a bottleneck for operations that require additional capacity. One solution that has been proposed is the use of Extreme Short Take Off and Landing (ESTOL) aircraft to increase runway capacity by running two canted tracks on a single runway. See, for example, Wei-Chien Sun, Klaus Broichhausen, Jost Seifert, and Bauhaus Luftfahrt e.V., *PROMISING FUTURE AIRCRAFT CONCEPT—ESTOL,* 26$^{th}$ International Congress of the Aeronautical Sciences, 2008.

Other aircraft configurations have been proposed, such as vertical or propulsive lift, each with their own set of shortcomings. For example, propulsive lift technology suffers from an increase in noise that occurs when airframe surfaces are placed in the propulsive system's exhaust to increase their lift force. Increased local flow velocities and turbulence levels, due to the propulsive system exhaust gases passing along the airframe lifting surfaces, cause an increase in maximum lift coefficient. The airplane's flight speed required for takeoff and landing can then be significantly reduced, allowing operation from shorter runways than those of conventional commercial airports. Unfortunately, interaction of high velocity turbulent exhaust flow with the airframe's solid surfaces generates additional noise radiation. Aeroacoustic processes that cause propulsive lift noise also are present in airframe noise and propulsive system installation noise. Furthermore, the vectored thrust of the propulsive wing may cause issues with ground personnel and equipment during landing and takeoff.

The challenge remains to develop and define an ultra low speed stall aircraft. U.S. government agencies such as the Defense Advanced Research Projects Agency (DARPA) continue to award grants to study such designs, such as the superior co-flow jet (CFJ) airfoil, for ESTOL applications. See, for example, *Transforming Aviation Transports DARPA Awards Research Grant to Dr. Ge-Cheng Zha for Future Aviation Transports*, University of Miami College of Engineering, Sep. 21, 2016. Efforts such as this indicate that there continues be a long-felt need in the art for an ultra low speed stall aircraft that has not yet been addressed.

Still further, there is increasing interest in ESTOL aircraft powered by newly emerging engine and motor technology, including electric motors, as evidenced by symposiums such as the SA Symposium 2017.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it provides for extremely low speed stall configuration for a manned or unmanned aircraft, enabling use of aircraft on short runways or moving landing areas, such as a ship, where the use of winged aircraft has traditionally been risky or altogether impossible.

In accordance with one embodiment of the present invention, the invention is a low stall speed aircraft comprising a central fuselage and two booms that are located on either side of the fuselage, disposed symmetrically about the airplane centerline. The central fuselage and two booms have vertically flat sides. The vertically flat sides of the fuselage and booms are used to channel airflow over the inner portion of the wing. The flat vertical wing store/plates, outboard of the thrust-line locations are used to channel the airflow between the booms and the outer wing store/plate location. The fuselage is also equipped with two vertical surface store locations that mount flush with the fuselage sides. These features in conjunction with the extended main-landing gear doors that are attached to the booms, act to provide vertical walls either side of the inboard flap controlling the flow of the air over the flapped section of the wing in this area. These features increase the air mass over the flaps by preventing losses due to vortices, as such increases the effectiveness of the flap.

The airplane may be configured to operate manned, unmanned or optionally manned. In one typical embodiment the airplane is classified as a light airplane and covers configurations up to a maximum gross weight of 19000 lb.; however other embodiments of the airplane may cover larger gross weights, and is not necessarily classified as a light airplane, with wing loadings (gross weight/wing area) of between 10.75 and 12.75 combined with power to weight ratios of (horsepower/gross weight) of between 0.15 and 0.25.

The features of the of the claimed inventive airplane act together to improve the effectiveness of the wings and flaps during takeoff and landing, and also during cruise. With the wing leading edge slats and trailing edge flaps deployed, the flat sided booms and fuselage, landing gear doors, wing, fuselage store mounting features inhibit the formation of wing tip vortices, increasing the effective aspect ratio of the wing without increasing wing span. The flat surfaces convert the stored energy of the wing tip vortices into an apparent thrust. The reduction in induced drag from the end plate surfaces thereby improves the wing lift-to-drag ratio. Combined with the vertical and horizontal thrust-line location, wing incidence, leading edge and trailing edge flap type and flap angle, this provides an energized propeller slipstream behind the propeller vena-contracta that is forced into the channels formed by the fuselage and booms, and between the booms and the outer mount locations, resulting in an angled downward thrust force that is capable of reducing the airplane take-off and landing distance. This gives the aircraft ESTOL or STOL (Short Take Off and Landing) capability beyond that of a conventional twin propeller, conventionally winged and tail configured airplane. Once clear of the ground, the flaps are retracted. With the flaps retracted, the airplane flies and performs in the cruise like a conventional airplane.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

Figure 1:
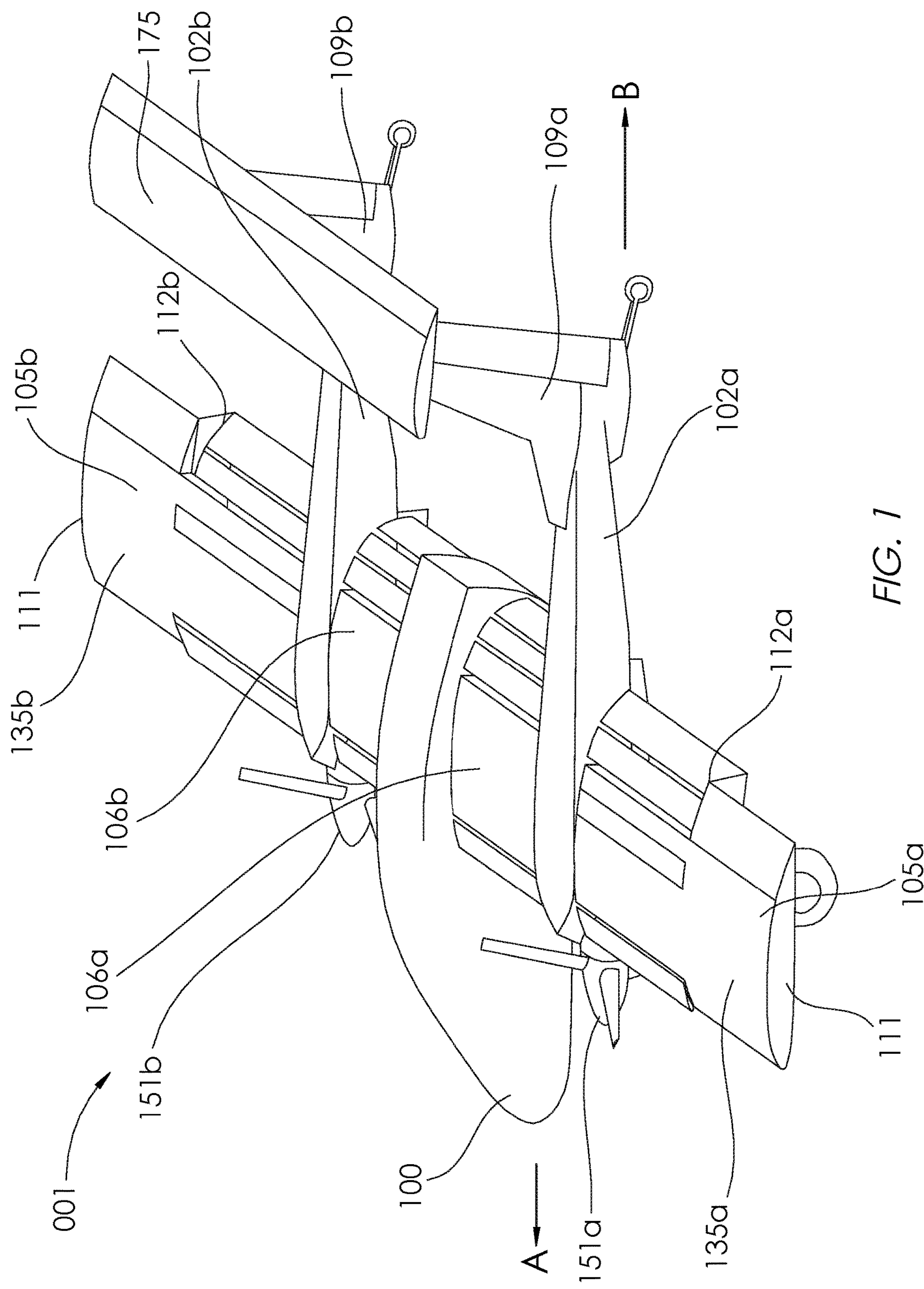
FIG. 1 depicts a perspective view of the airplane of the invention, shown from the top and slightly aft of the fuselage, showing wing chord lines.
Figure 2:
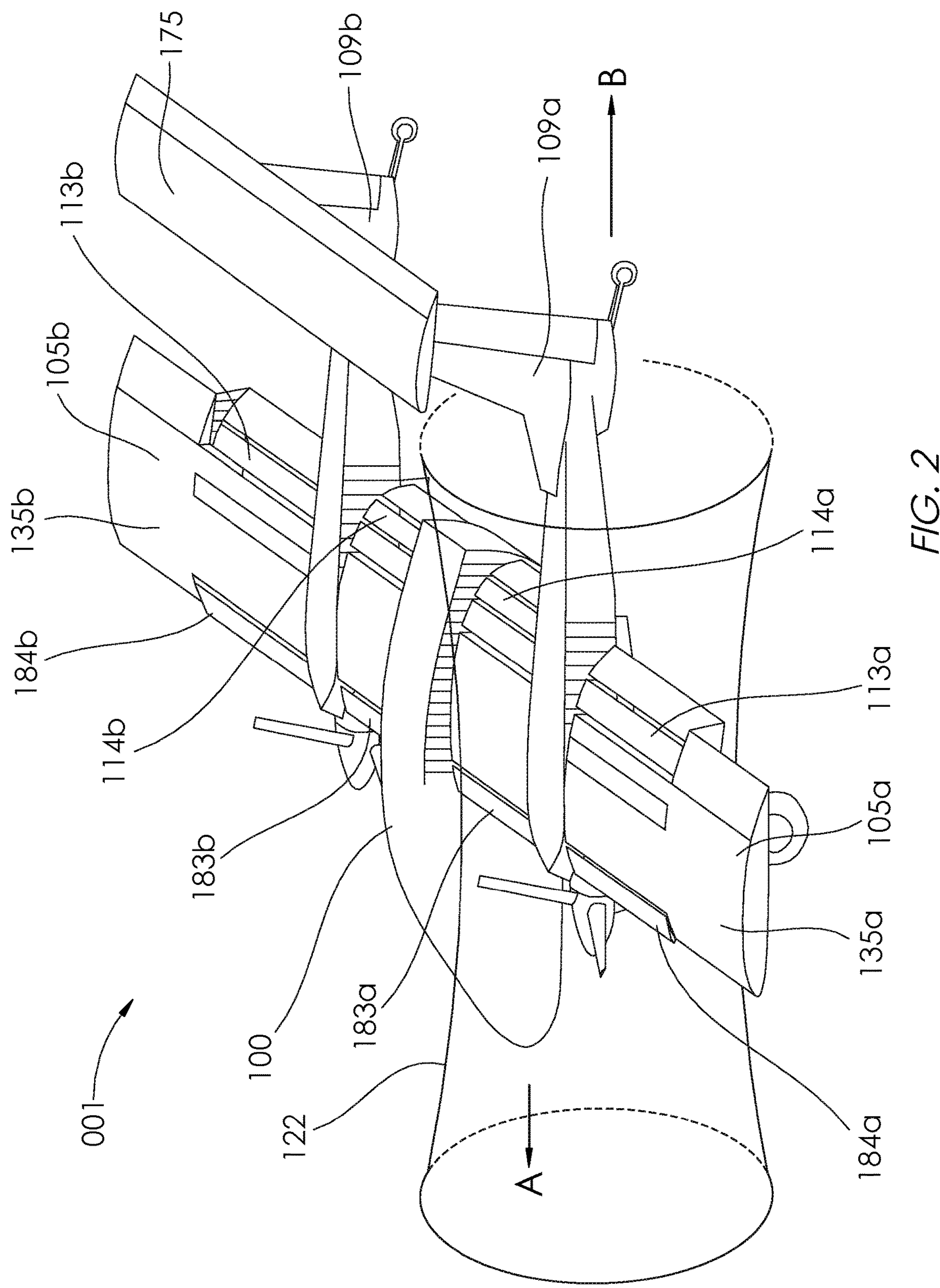
FIG. 2 depicts a perspective view of the airplane of the invention, shown from the top and slightly aft of the fuselage, showing propeller wash over the wing and boom.

In the figures, like item callouts refer to like features.

DETAILED DESCRIPTION OF THE INVENTION

The following documentation provides a detailed description of the invention. In the drawings and specification, like element numbers are used to designate the same elements in the various figures.

As used herein, a Fowler flap is defined as an extensible trailing-edge flap that in the deflected position exposes a slot in the airplane wing.

As used herein, "engine thrust line", "propeller thrust line" and "thrust line" are used interchangeably, and have the same meaning.

As used herein, "inner portion", "wing inner portion", "wing root" and "wing root section" mean that portion of the wing that is between the boom and the fuselage.

As used herein, "outer portion" and "wing outer portion" mean that portion of the wing that is between the boom and the wing tip.

In the figures, "forward" means the direction depicted by arrow "A", and "after" and "afterward" mean the direction depicted by arrow "B".

As used herein, "planform sweep" means the angle between the leading edge of an item, such as for example the leading edge of a wing section, and a line that is perpendicular to the longitudinal axis of the aircraft. Plan form sweep angles are defined by the plan form depicted in FIG. 15. For example, wing planform sweep angle E and horizontal stabilizer planform sweep angle D are defined relative to a longitudinal axis of the aircraft C.

As used herein, "flying horizontal stabilizer", "all flying horizontal stabilizer" and "flying stabilizer" all include within their meaning a stabilator. "Stabilator" includes within its meaning a free floating aerodynamic surface that is both aerodynamically and mass balanced, whose function is, when trimmed, to function as an aerodynamic longitudinal horizontal stabilizer that reacts out of balance wing loads, and to balance out larger out of balance forces on the main wings than a fixed horizontal stabilizer and elevator are able to balance, due to the fact the whole surface of the stabilator is rotable over a range of motion and thus has the ability to change its angle of attack.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

Referring now to FIGS. 1-6, an aircraft of the invention 001 is a low stall speed aircraft, generally having a fuselage 100 that has a first side 101*a* and a second side 101*b*, wherein each first side 101*a* and second side 101*b* each comprise a vertically oriented flat surface; a first boom 103*a* and a second boom 103*b*, each boom having an inner vertically oriented flat surface 181*a* or 182*a*, respectively, an outer vertically oriented flat surface 181*b* or 182*b*, respectively, a forward end, and an afterward end 104*a* or 104*b*, respectively; a first wing 105*a* and a second wing 105*b*, each having a wing inner portion 106*a* or 106*b*, respectively, a leading edge 107*a* or 107*b*, respectively, and a trailing edge 108*a* or 108*b*, respectively; a first vertical stabilizer 109*a* and a second vertical stabilizer 109*b*, each having a lower end 120*a* or 120*b* and an upper end 121*a* or 121*b*; and a flying horizontal stabilizer 175; wherein a first wing root 130*a* of the inner portion 106*a* of first wing 105*a* is attached to the first side 101*a* of said fuselage 100, and the second wing root 130*b* of the inner portion 106*b* of second wing 105*b* is attached to the second side 101*b* of fuselage 100; and wherein the first boom 103*a*, from its forward end, extends in an afterward direction from the trailing edge 108*a* of the first wing 105*a*, and the second boom 103*b*, from its forward end, extends in an afterward direction from the trailing edge 108*b* of the second wing 105*b*; and wherein the aft end 104*a* of the first boom 103*a* is attached to the lower end 120*a* of said first vertical stabilizer 109*a*, and said aft end 104*b* of said second boom 103*b* is attached to the lower end 120*b* of said second vertical stabilizer 109*b*; and wherein a first propeller 151*a* is disposed in said first boom 103*a* at its forward end, said first propeller 151*a* disposed so as to provide thrust to the airplane 001 in a forward direction A and propeller wash 122 in a rearward direction B, and a second propeller 151*b* is disposed in said second boom 103*b* at its forward end, said second propeller 151*b* is disposed so as to provide thrust in a forward direction A and propeller wash 122 in a rearward direction B; and wherein said flying horizontal stabilizer 175 comprises an underneath surface; and wherein said upper end 121*a* of said first vertical stabilizer 109*a* and said upper end 121*b* of said second vertical stabilizer 109*b* are attached to the underneath surface of said flying horizontal stabilizer 175.

Still referring to FIGS. 1-6, vertical stabilizer leading edge root extension 125*a*, wingtips 111, forward wheels 192*a, b* and afterward wheels 191*a, b* are depicted for reference.

Wing Configuration

Figure 7:
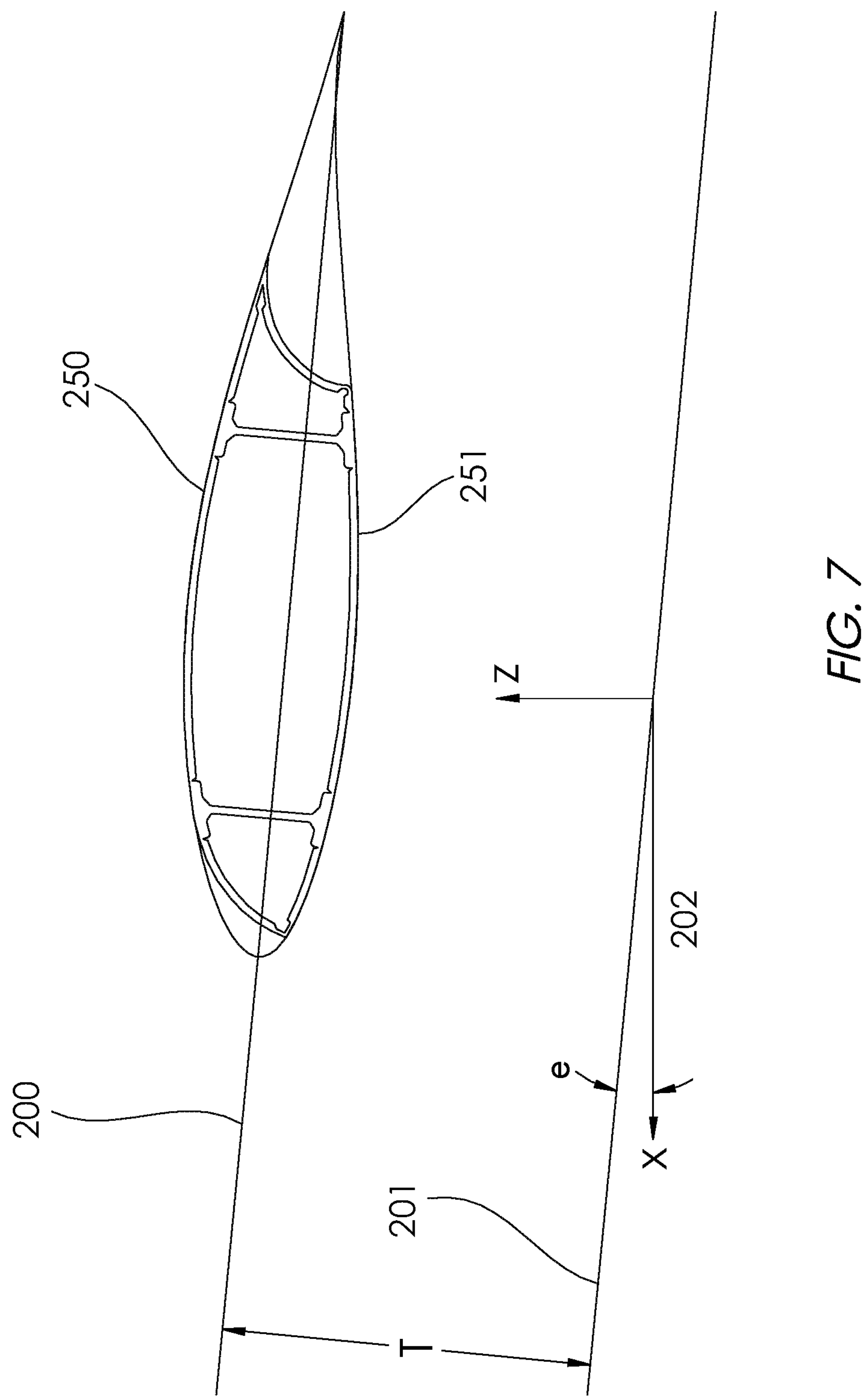
FIG. 7 depicts a cross section schematic view of the wing section of an embodiment of the airplane of the invention, depicting the upper airfoil surfaces, wing chord line, engine thrust line in parallel with the wing chord line, and the direction of vertical lift component Z oriented so as to oppose the force of gravity on the airplane.

Still referring to FIGS. 1-6, the airplane wings comprise a high lift airfoil profile set at zero degree planform sweep. The wings may have a constant chord section. The wing root section, or inner wing portions, 106*a* and 106*b* between the fuselage sides 101*a* and 101*b* and booms 103*a* and 103*b* (shown in cross section in FIGS. 10A and 10B) is inclined to a maximum of +8 degrees nose up incidence from the horizontal (as shown in FIG. 7). The wing section outboard of booms 103*a* and 103*b* up to the point where the flap terminates at 112*a* and 112*b*, respectively washes out from the nose up angle at the end of the flap, to 0 degrees to horizontal at the wing tip 111. The wing chord to propeller diameter ratio may be within the range 0.75 to 1.00. The wing may be modular in construction, allowing for straightforward increases in wing span in embodiments of the aircraft designed for higher weight applications. The modular design of the wing allows for more economical production and assembly costs because various configurations of the aircraft may be produced using a common core of modular wing components.

Figure 3:
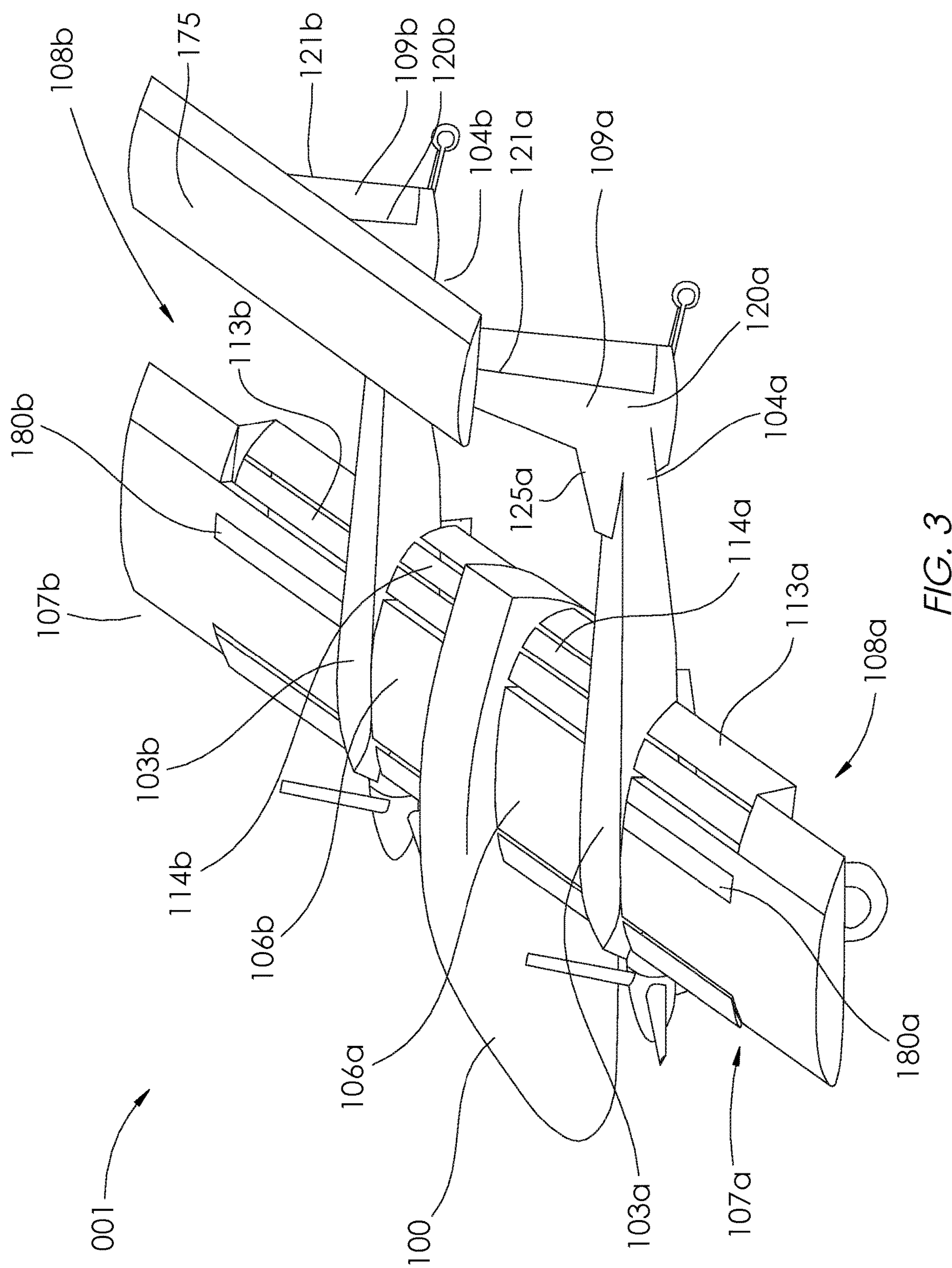
FIG. 3 depicts a perspective view of the airplane of the invention, shown from the top and slightly aft of the fuselage, showing the all flying horizontal stabilizer and twin vertical stabilizer chord lines, and further depicting the leading edge root extension.
Figure 10A:
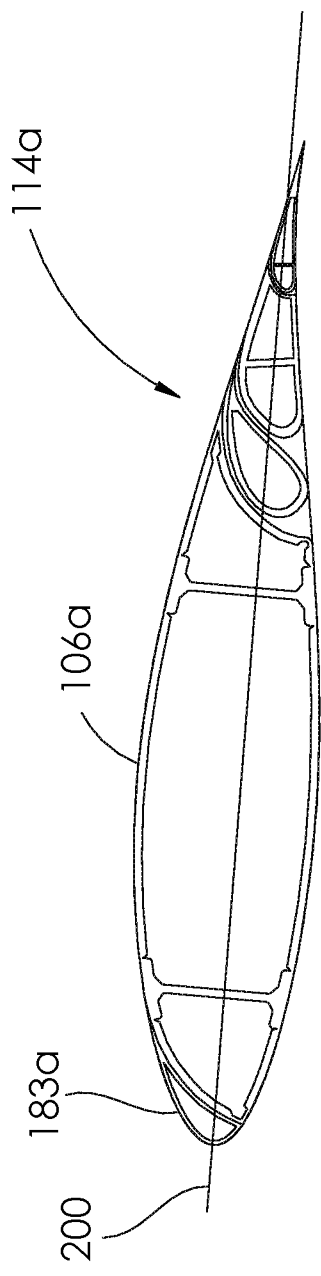
FIG. 10A depicts a cross section view of an inner portion of the wing between the boom and fuselage of an embodiment of the aircraft, showing the flaps retracted, and depicting the wing chord line.
Figure 10B:
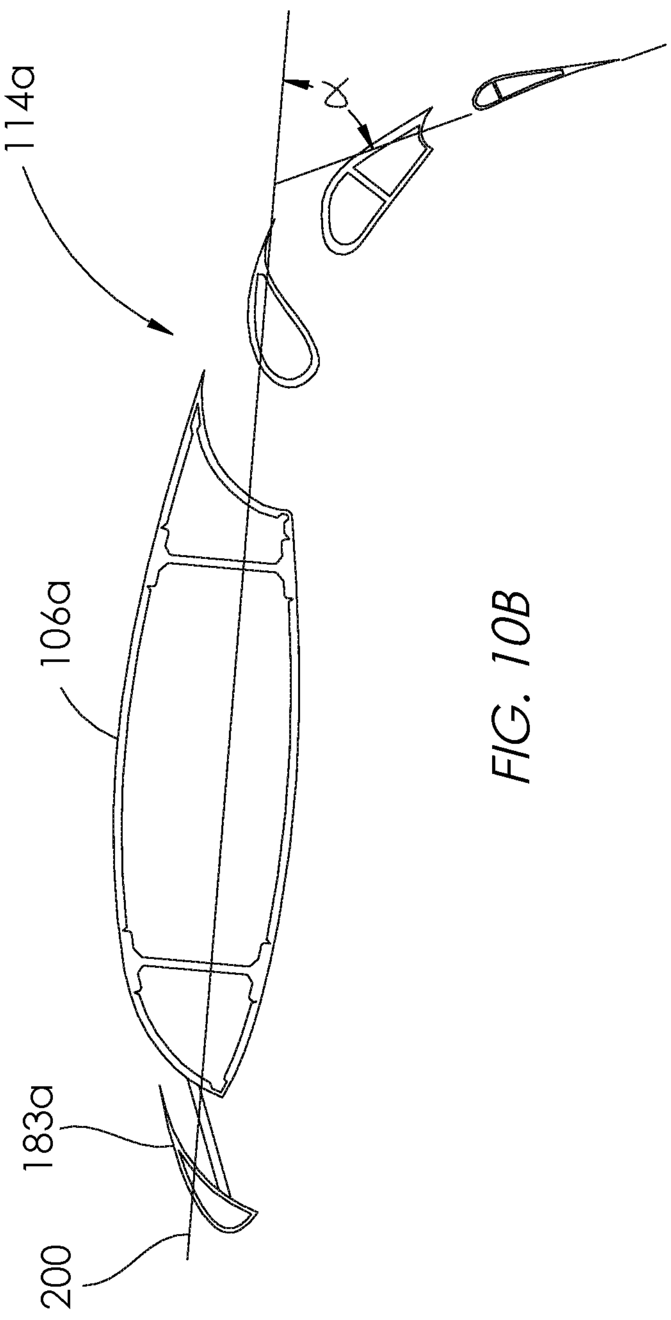
FIG. 10B depicts a cross section view of an inner portion of the wing between the boom and fuselage of an embodiment of the aircraft, showing the flaps extended, and depicting the angle of deflection of the extended Fowler flap to the wing chord line.
Figure 11A:
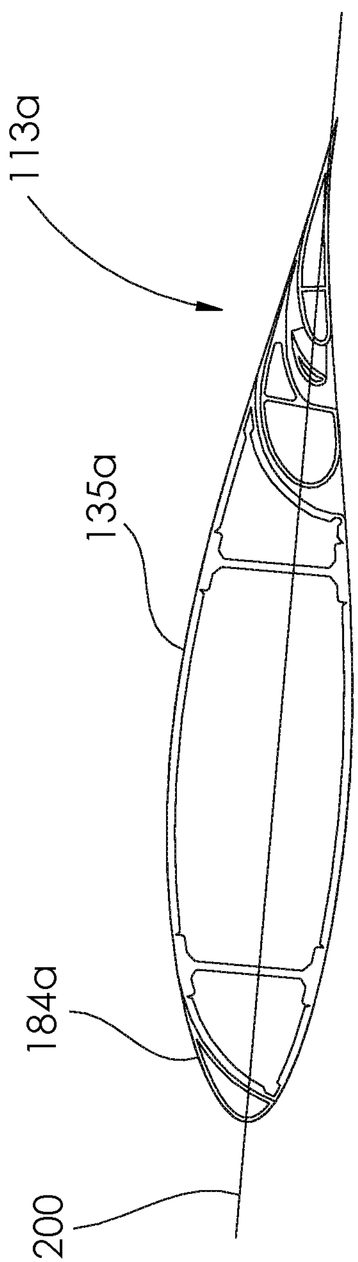
FIG. 11A depicts a cross section view of an outer portion of the wing between the boom and wing tip of an embodiment of the aircraft, showing the flaps retracted, and depicting the wing chord line.
Figure 11B:
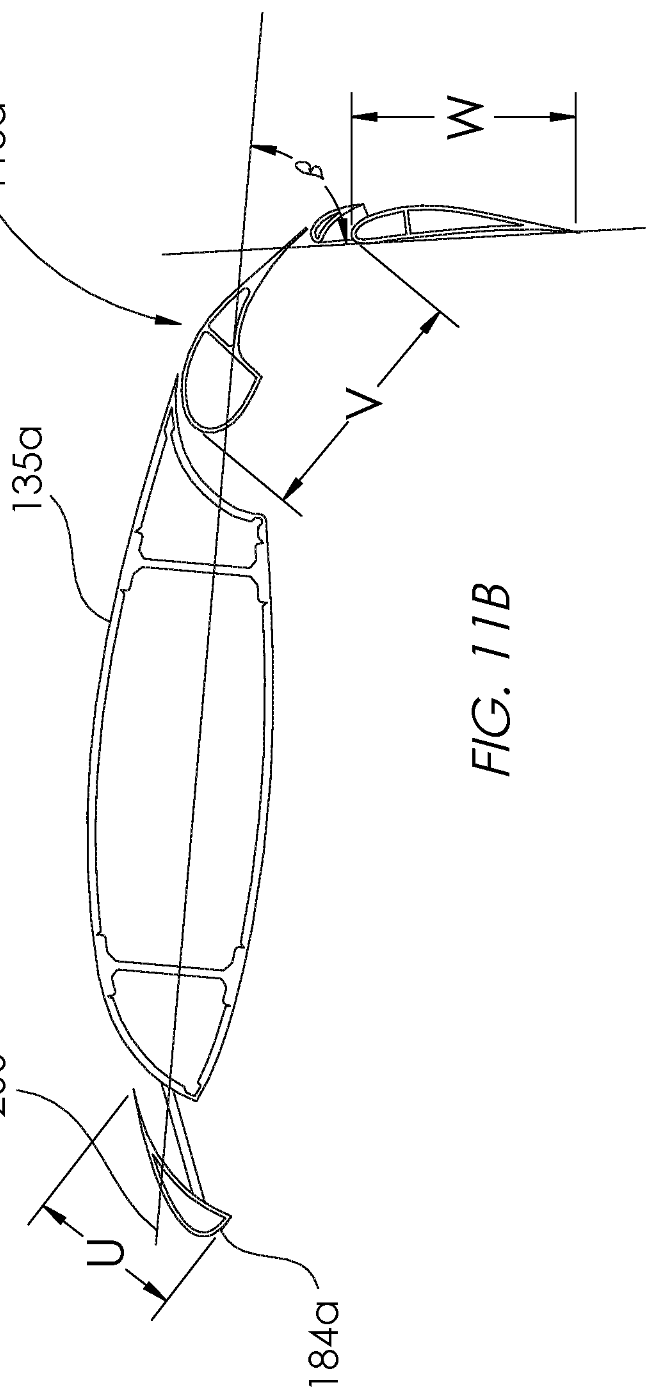
FIG. 11B depicts a cross section view of an outer portion of the wing between the boom and wing tip of an embodiment of the aircraft, showing the flaps extended, and depicting the angle of deflection of the extended Fowler flap to the wing chord line.
Figure 13A:
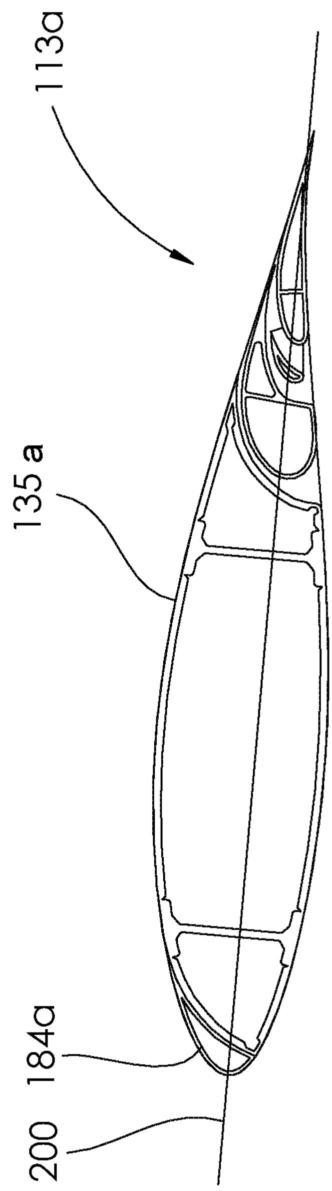
FIG. 13A depicts a cross section view of an outer portion of the wing between the boom and wing tip of an embodiment of the aircraft, showing no aileron droop.
Figure 13B:
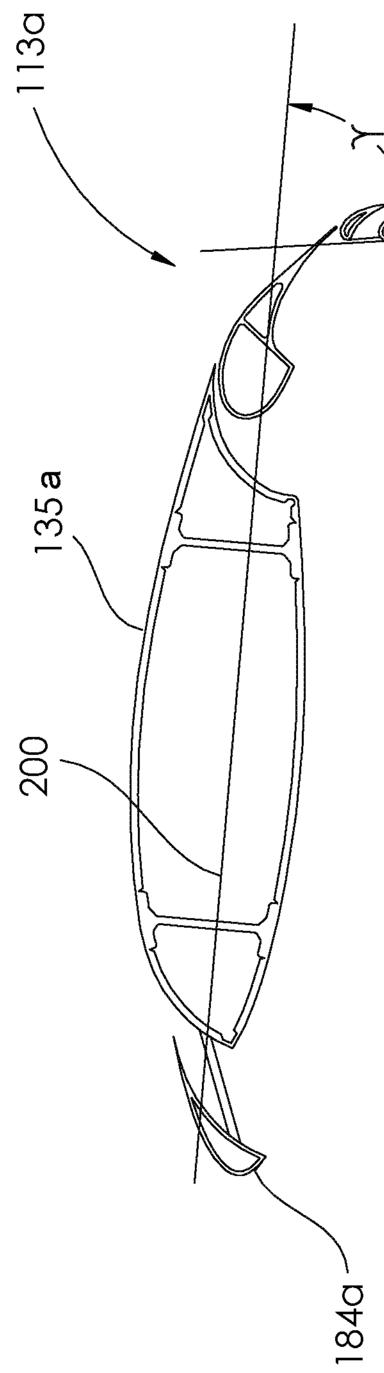
FIG. 13B depicts a cross section view of an outer portion of the wing between the boom and wing tip of an embodiment of the aircraft, showing aileron droop.

Still referring to FIGS. 1-6, and referring also to FIGS. 10A, 10B, 11A, 11B, 13A and 13B, the wing root sections, or inner wing portions, 106*a* and 106*b* between the fuselage 100 and the two booms 103*a* and 103*b*, depicted in cross section in FIGS. 10A and 10B, may be fitted with a double slotted or triple slotted Fowler trailing edge inner flaps 114*a* and 114*b*, respectively, that can be deployed up to a maximum of 85 degrees from the wing chord line 200 as depicted by angle $\alpha$ in FIG. 10B. The outer portions of the wing 135*a* and 135*b*, i.e. the wing sections outboard of the two booms 103*a* and 103*b*, up to the points where the flaps terminate 112*a* and 112*b* (shown in FIG. 1), depicted in cross section in FIGS. 11A and 11B, may be fitted with a multiple slotted Fowler trailing edge outer flap 113*a* and 113*b* that can be deployed to a maximum of up to 45 degrees from the wing chord line 200 as depicted by angle $\beta$ in FIG. 11B. All flap surfaces may be in mechanical communication via mechanical linkage or may be motivated by electric or fluid actuators in communication with one another or with a controller, such that they are thus controlled and/or constrained so that they move together: i.e., they extend and retract in unison, albeit they may move at different rates of deployment. In an embodiment, the flap deployment rate is set as to give twice the angle of deflection on the inner flaps 114*a* and 114*b* for each incremental angle of deflection on the outer flaps 113*a* and 113*b*. That is to say, inner flaps 114*a* and 114*b* may deploy at up to twice the rate of outer flaps 113*a* and 113*b*. Thus the inner flaps 114*a* and 114*b* are adapted to rotate the propeller slipstream downward to a maximum of 85 degrees in the inboard section of the wing 106*a* and 106*b*, and the outboard flaps 113*a* and 113*b* are adapted to rotate the propeller slipstream downward to a maximum of 45 degrees at the outboard section of the wing 135*a* and 135*b*. The vertical sides of the tail booms 103*a* and 103*b*, the vertical portions of sides 101*a* and 101*b* of fuselage 100, the main-landing gear doors 123 (when deployed) and under-fuselage store structures 124 operate together to form the sides of first channel P and second channel Q (depicted in FIG. 6) for directing and channeling the slipstream in an afterward direction so that is has increased effect as it impinges flaps 114*a* and 114*b*. The wing root sections, or inner wing portions, 106*a* and 106*b* between the fuselage 100 and the two booms 103*a* and 103*b* may comprise retractable leading edge slats 183*a* and 183*b*, respectively, depicted in FIGS. 10A and 10B that may be deployed in concert with the inner trailing edge flaps 114*a* and 114*b*, respectively. The wing sections outboard of the two booms 103*a* and 103*b*, up to the point where the flap terminates, may comprise retractable leading edge slats 184*a* and 184*b* that are deployed in concert with the outer trailing edge flaps 113*a* and 113*b*. Both flapped areas of each wing are disposed in the propeller slipstream behind the propeller vena-contracta. The wing sections outboard of the flap termination points 112*a* and 112*b* may also comprise ailerons to control roll in the cruise configuration. The ailerons 113*a* and 113*b* may also be adapted to 'droop' to further improve lift as depicted in FIGS. 13A and 13B. The angle $\gamma$ of aileron droop as measured from the wing chord line 200 may be any angle. In an embodiment the angle of droop relative to the wing chord line 200 may be any angle up to 80°, but this range is given as exemplary of just one embodiment, and other all ranges are within the scope of the invention. To complement roll control at airspeeds close to the minimum flying speed, the wing sections of each wing that are outboard of the booms may be fitted with differential roll-spoilerons 180*a* and 180*b* as depicted in FIG. 3. Roll-spoilerons 180*a* and 180*b* may be mounted to the rear of the wing chord behind the propeller slip steam vena-contract for full effectiveness. The long wing span provides roll damping that may occur at minimum controlled flying speed, or that may occur due to any application of asymmetric thrust. Dimensions U, V and W are depicted for reference.

Engine and Thrust Line

The airplane can be configured with one or more engines. In various embodiments, the airplane may have two (see FIG. 1) or four propellers (see FIG. 12) that are used to provide thrust. The engines may be petrol, diesel, gas turbine, hydrogen fuel cell, electric fuel cell or any combination thereof. In the embodiments in which hybrid engines are used (diesel electric for example) one engine (diesel) may be used as a power plant and generator for the other (electric motors). Engine size is not limited.

The propellers may be arranged in a tractor configuration and thus may be mounted separately (for example two propellers as in FIG. 1) or in coaxial pairs (for example four propellers as in FIG. 12) in front of the booms. The propellers may be mounted directly to the engine, or remotely from the engine, via transmissions (mechanical shaft driven or electrical) for synchronized application of power.

Referring now to FIG. 7, in an embodiment, the engine thrust-line 201 may be inclined nose-up to a maximum angle e of +8 degrees from a horizontal line x, where horizontal line x is defined as being perpendicular to the downward force of gravity, and to lift direction Z, and is parallel to the wing chord 200. The thrust-lines 201 are set parallel to the wing chord line and below the wing at a vertical distance T of propeller thrust line to propeller diameter S (see FIG. 6) of 0.2 to 0.3 in order to stabilize the nose down pitching moment that results from wing trailing edge flap deflection. Propeller rotation is set such that the left hand propeller rotates opposite to the right hand propeller when viewed from the rear of the airplane. For co-axial propeller installations, the propellers on each thrust-line rotate both opposite to the propeller on the same thrust line, and immediately opposite to the propeller directly opposite the airplane centerline. Propeller blade diameter and blade number are not limited. Wing upper surface 250 and wing lower surface 251 are depicted for reference.

Empennage Pitch and Yaw Control

At the aft end of the booms 103*a* and 103*b* are two separate vertical stabilizers 109*a* and 109*b*, respectively. The vertical stabilizers provide directional stability to the aircraft. These are fitted with conventional rudder surfaces on the aft edge of the vertical stabilizers to provide yaw control. Ventral fins may be attached to the underside of the booms to improve directional stability at high angles of attack. Vertical stabilizer leading edge root extensions 125*a* and 125*b* may be fitted to the upper surface of the booms 103*a* and 103*b* at the intersection with the leading edge of the vertical stabilizers 109*a* and 109*b*, and produce a bound vortex which improves the effectiveness of the fin and rudder surfaces at high yaw and rudder angles. The vertical stabilizers may be of symmetric airfoil cross section. A large all-flying horizontal stabilizer 175 is attached to the upper end of each vertical stabilizers 109*a* and 109*b* via a rotable attachment such as, for example, bearings, and it straddles the top of both vertical stabilizers 109*a* and 109*b*, so that it is rotably attached to the upper end of the vertical stabilizers 109*a* and 109*b*. The all-flying horizontal stabilizer 175 may extend laterally outboard of the vertical stabilizers 109*a* and 109*b* to improve effectiveness at lower airspeeds and to improve the effectiveness of the vertical stabilizers 109*a* and 109*b* at high angles of attack. The all-flying horizontal stabilizer 175 may be mass balanced with counterweights. The horizontal stabilizer 175 may also be comprised of an airfoil cross section mounted at zero degree wing planform sweep. When actuated, the all flying horizontal stabilizer 175 rotates about its bearings and provides the function of a stabilizer for force balance and an elevator for longitudinal control. The trailing edge of the all flying horizontal stabilizer 175 may also comprise an anti-servo/trim tab. Flight controls for any of the embodiments of the aircraft may be mechanical, fly-by-wire or fly-by-light.

Fuselage Configuration

Referring again to FIGS. 1-6, in an embodiment, the fuselage houses pilots, payload, sensors or unmanned systems, nose landing gear (for the tri-gear derivative) and extended range fuel tanks and systems. The fuselage 100, engines, main-landing gear and booms 103*a* and 103*b* may be mounted below the wings 105*a* and 105*b* resulting in a low center of gravity providing the aircraft with longitudinal and lateral pendulum stability. The vertically flat portions of sides 101*a* and 101*b* of fuselage 100 and booms 103*a* and 103*b* are used to channel the airflow over the inner portions 106*a* and 106*b* of wings 105*a* and 105*b*. The flat, vertical wing store mounting structures 124, which may be attached to an underneath surface of fuselage 100 and disposed outboard of the engines, are used to channel the airflow through channels P and Q (depicted in FIG. 6) between booms 103*a* and 103*b* and the outer wing store mounting structures 124.

Landing Gear Configuration

Referring now to FIGS. 1, 2, 3, 4, 5, 6, and 12 the aircraft comprises wheeled landing gear that is attached to one or more lower or underneath surfaces of the aircraft via a mechanical structure. There are a plurality of alternative landing gear embodiments of the aircraft that include a tri-gear embodiment and a quad-gear embodiment. Tall landing gear combined with the fuselage store mounts is used to increase the distance from the thrust-line to the ground and to prevent recirculation of the wing and slip-stream downwash through the propeller plane at minimum flying control speed. Both alternative landing gear configurations are configured so as to cause the aircraft to be disposed in a "nose up" attitude while on the ground in order to channel all air flow downward and rearward.

Figure 4:
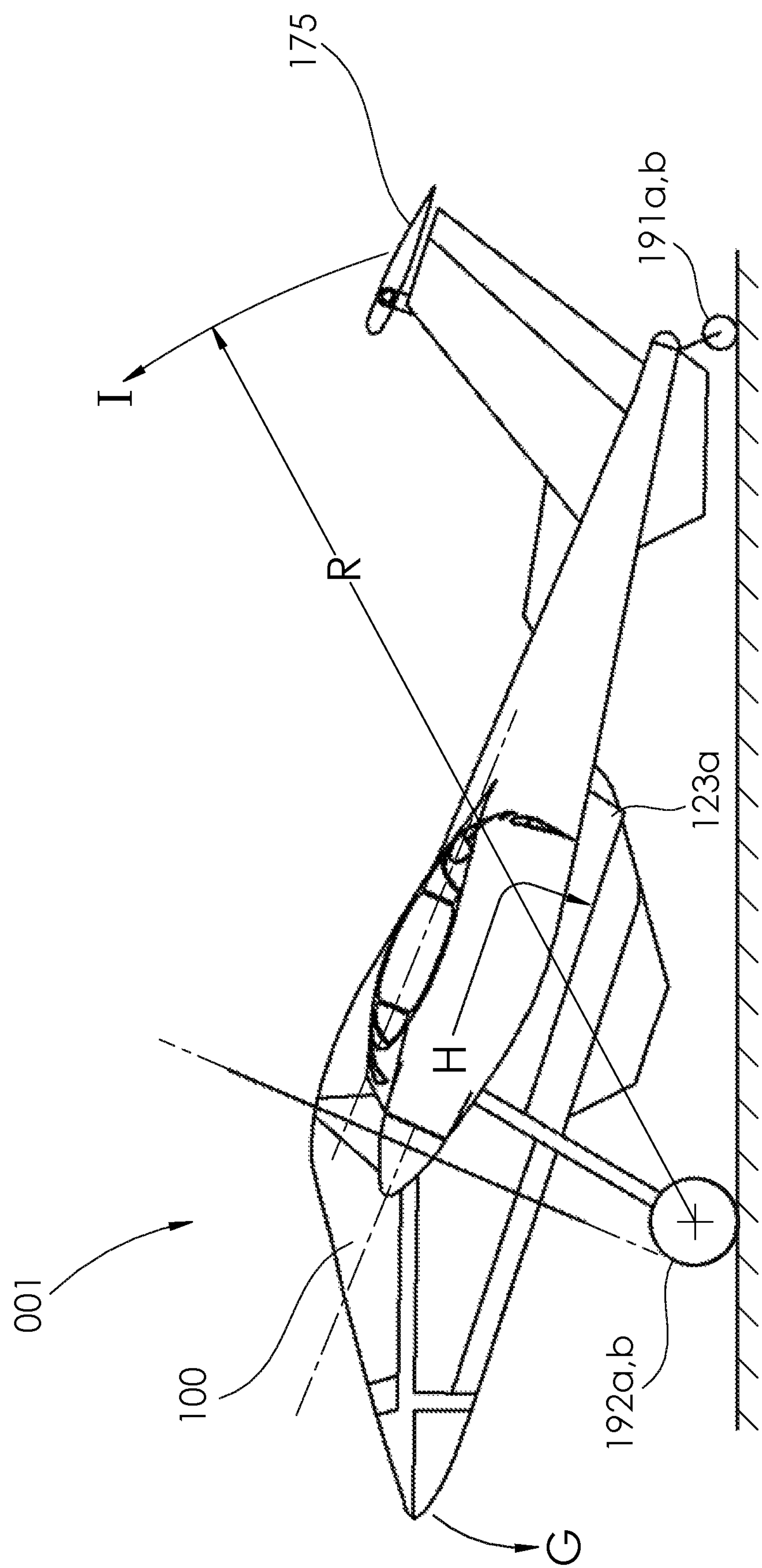
FIG. 4 depicts an orthogonal side view of the airplane of the invention, depicting landing gear doors and vertical store mounting points.
Figure 5:
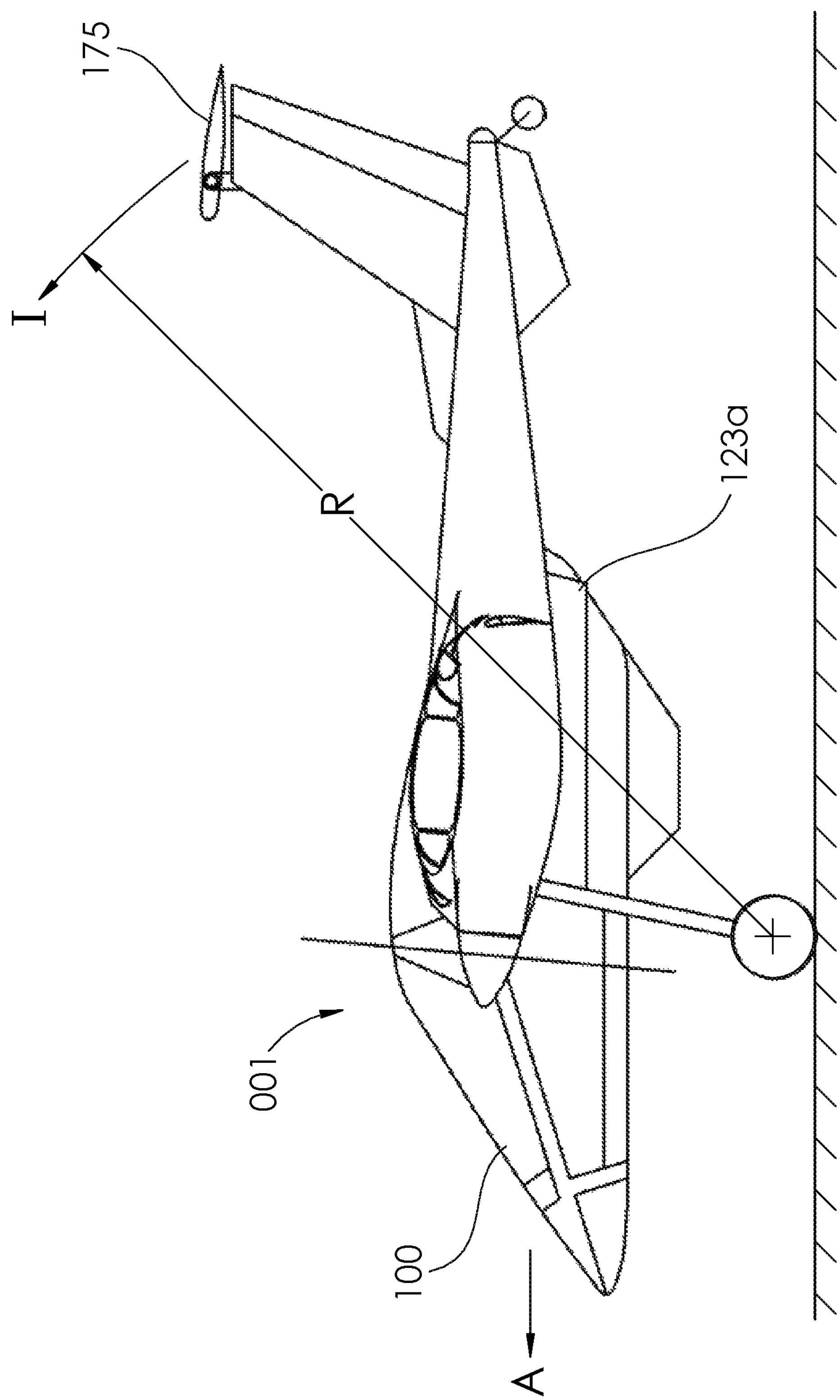
FIG. 5 depicts an orthogonal side view of the airplane of the invention, depicting the angled thrust line of the airplane, with dynamic pressure imparted on the horizontal stabilizer by pitching forward while the aircraft has the brakes applied.
Figure 6:
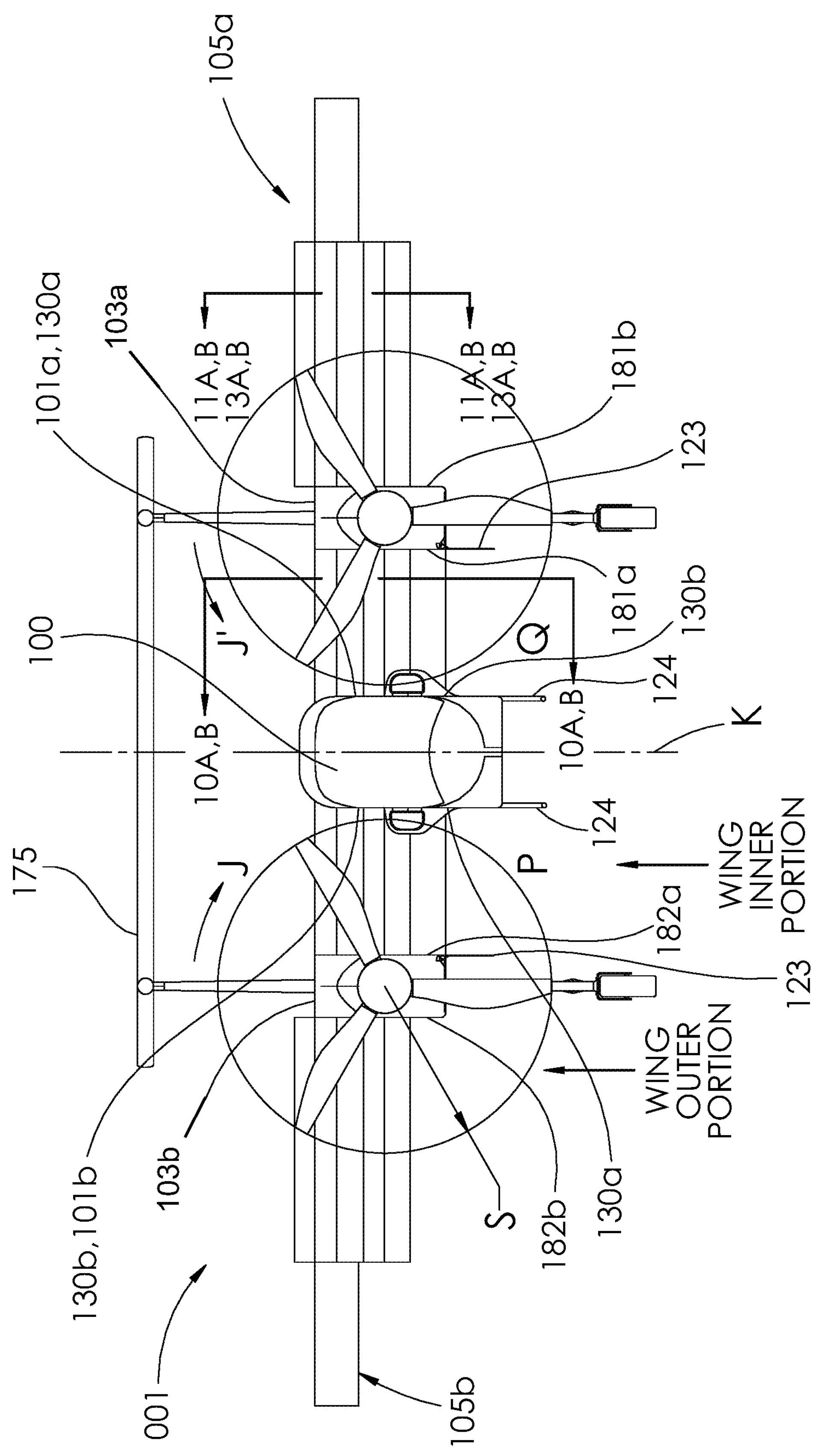
FIG. 6 depicts a front orthogonal view of the airplane with the flaps extended.

A quad-gear embodiment of aircraft 001 is depicted in FIGS. 1, 2, 3, 4, 5, and 6. The quad-gear embodiment may be used to accelerate air over the horizontal stabilizer while on the ground. Referring now specifically to FIGS. 4 and 5, it is shown that pitching the aircraft nose forward (i.e. rotating the nose downward) in the direction of arrow G against the main gear brakes raises the rear of the aircraft by applying the wheel brakes and rotating the rear of the aircraft upwards along arc I that is defined by radius R, which has an origin at a the axis of rotation of the forward landing gear wheels 192*a* and 192*b*. Raising the tail along the path of arrow G accelerates airflow over horizontal stabilizer 175 as the horizontal stabilizer 175 rises from the "at rest" position depicted in FIG. 4 to the position depicted in FIG. 5, in which dynamic pressure is imparted on horizontal stabilizer 175. This generates sufficient lift on the horizontal stabilizer 175 to balance the main wing lift at low forward speeds, reducing the take-off distance. Propeller wash is directed along the path of arrow H, through channels P and Q (depicted in FIG. 6) created by the landing gear doors 123, the vertical portions of fuselage sides 101*a* and 101*b* and stores mounting structures, and is directed downward by flaps 113*a* and 113*b*.

Other Aircraft Configuration Characteristics

Referring again to FIG. 6, an embodiment of an aircraft of the invention 001 may comprise a left hand (LH) and a right hand (RH) engine, one engine on each boom, or may comprise a single engine in the fuselage connected to each propeller by a transmission. In the case in which the engine(s) are piston engines, the engine drive shaft(s) may be connected to the propellers by a common mechanical or electrical transmission, or they may remain unconnected. In the case in which the engine(s) are electrical or piston/hybrid engines, their drive shaft(s) may be connected to the propellers via an electrical transmission. The transmission balances the thrust from each propeller about the aircraft centerline K to provide a symmetric airflow over both flaps. In the case in which the aircraft comprises a single engine mounted in the fuselage, a transmission is used to drive the two or more propellers at each boom nose location. The propellers may, and preferably do, spin in a counter rotating fashion, for example as depicted by arrows J and J', to provide air flow over the wings and flaps that is symmetric about aircraft centerline K.

Figure 8:
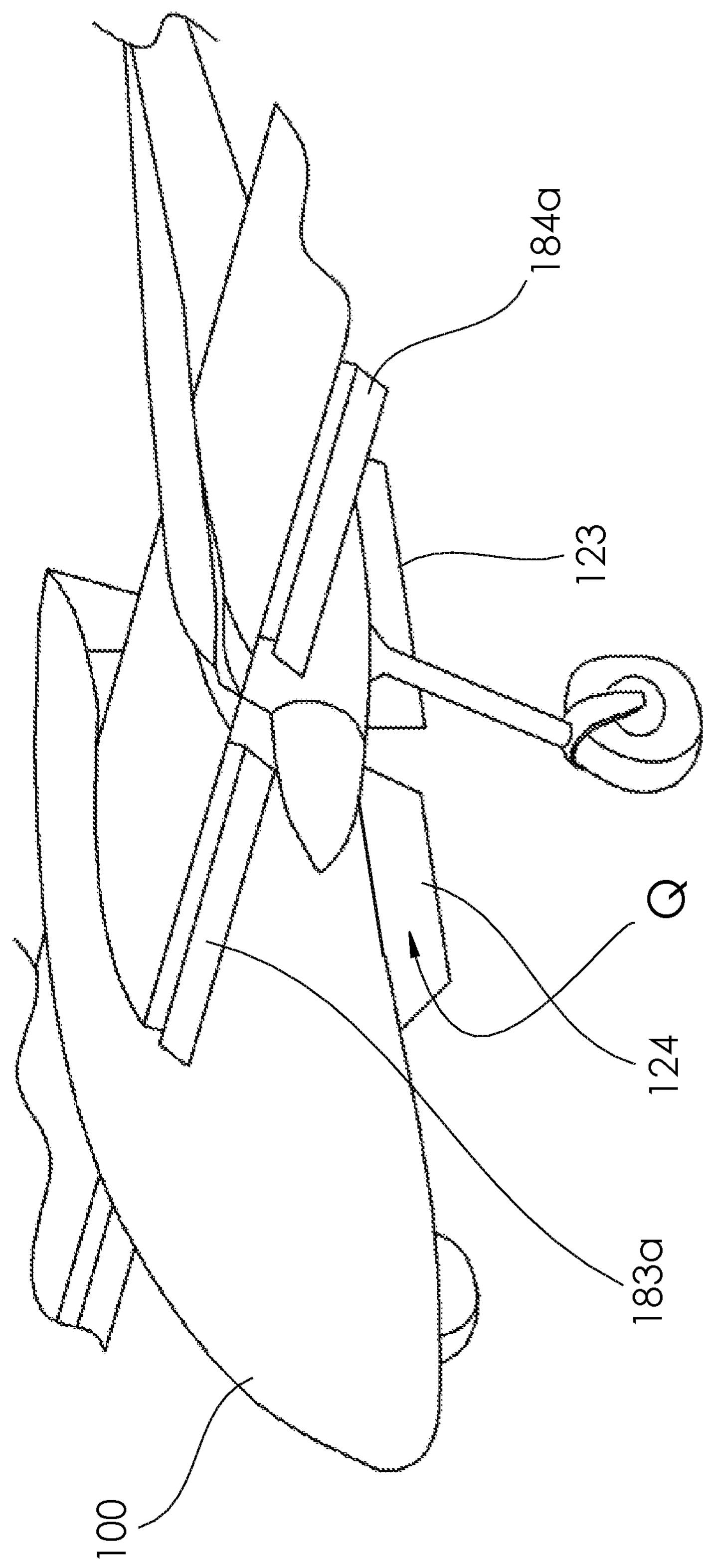
FIG. 8 depicts a front perspective view of an embodiment of the airplane of the invention, showing the inner flap channel, outer flap channel and landing gear door, all used for effectively directing airflow.

Referring now to FIG. 8, a front perspective view of an embodiment of the airplane of the invention, showing channel Q, is depicted, outer flap channel and landing gear door, all used for effectively directing airflow. Channel Q is formed partially by vertical surfaces on stores mounting structure 124 and landing gear door 123. Leading edge slats 183*a* and 184*a* are depicted for reference. Fuselage 100 is shown for reference.

Figure 9:
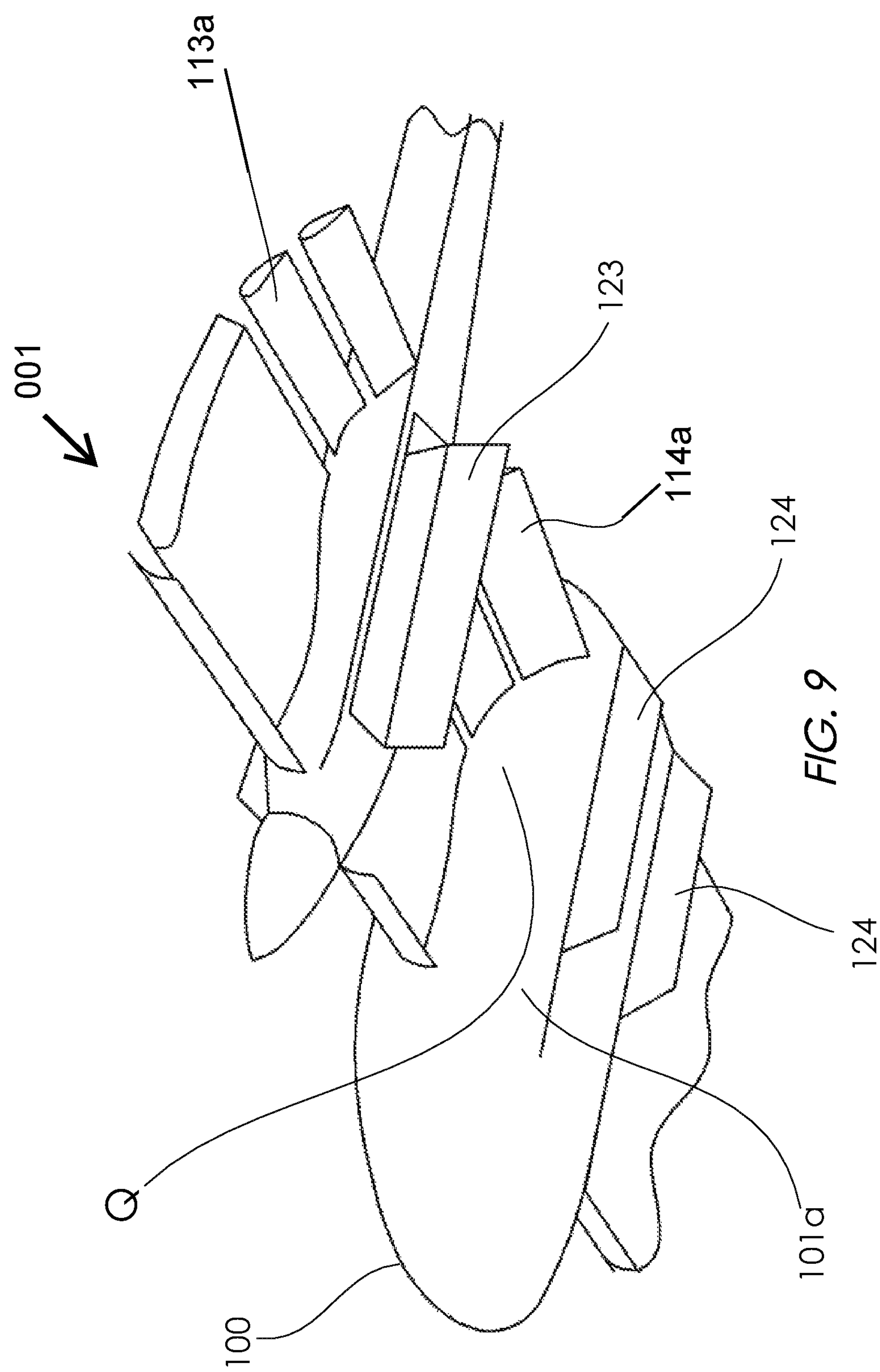
FIG. 9 depicts a bottom perspective view of an embodiment of the airplane of the invention, showing the inner flap channel, outer flap channel, tail boom and landing gear door, all used for effectively directing airflow with the flaps extended.

Referring now to FIG. 9, a bottom perspective view of an embodiment of the airplane of the invention 001, showing the channel Q used for effectively directing airflow with the flaps extended is depicted. Fuselage 100 is identified for reference. A flat vertically oriented portion of side 101*a* of fuselage 100, a flat vertically oriented portion of stores mounting structure 124, and a flat vertically oriented surface of landing gear door 123 work together to form channel Q for directing airflow in an afterword direction into inner trailing edge flap 114*a*. Outer trailing edge flap 113*a* is depicted for reference.

Figure 12:
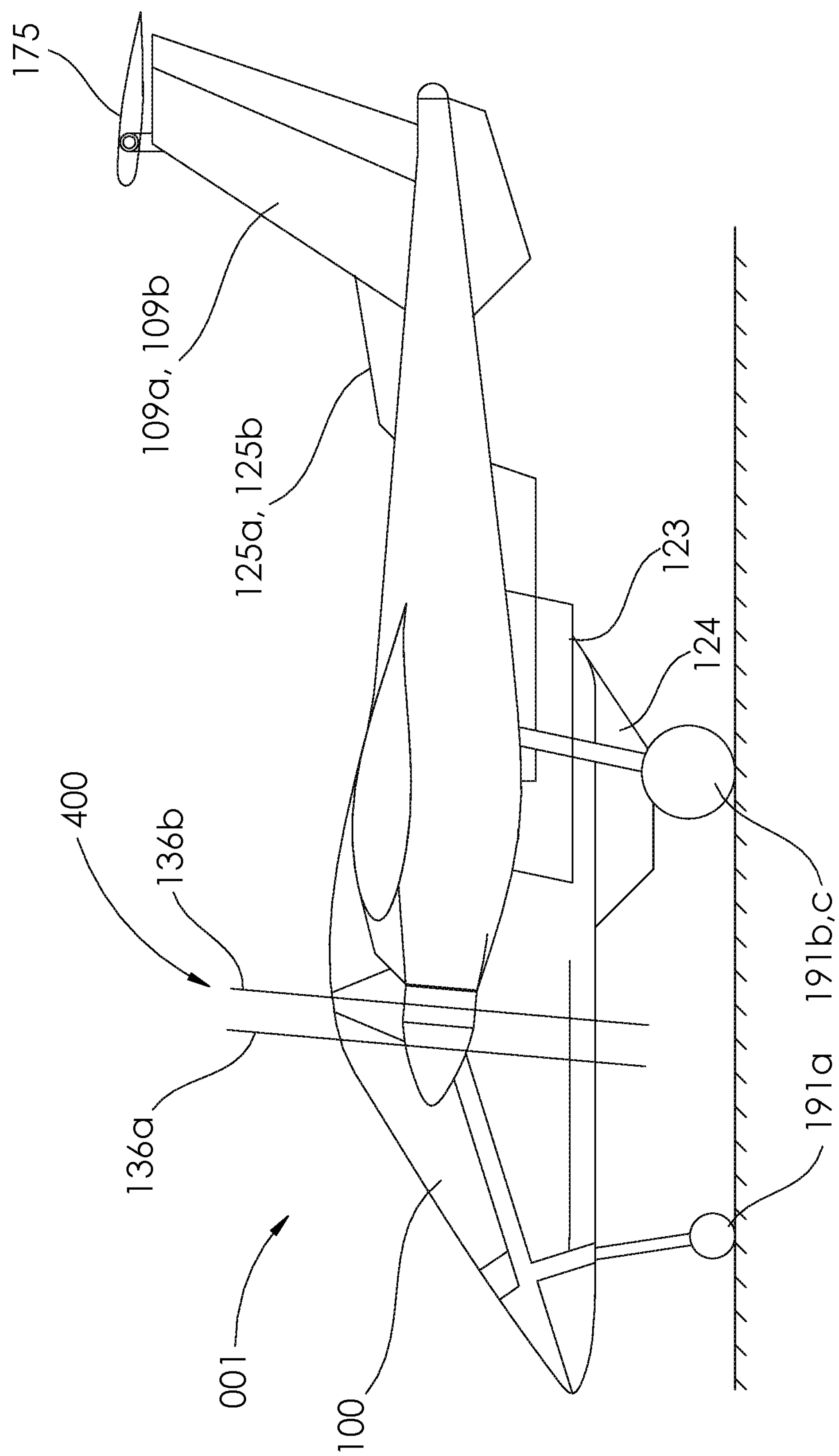
FIG. 12 depicts a side orthogonal view a tri-gear embodiment of the airplane.

Referring now to FIG. 12, an embodiment of the aircraft of the invention 001 is depicted in which coaxial propellers 136*a* and 136*b*, forming coaxial propeller pair 400 comprise the invention. While the embodiment shown is for a tricycle gear configuration comprising a single forward nosegear and wheel 191*a* and rear gear and wheels 191*b* and 191*c*, any embodiment, quad-gear, tri-gear or otherwise, may comprise coaxial propellers. Callouts to fuselage 100, stores mounting structure 124, landing gear door 123, vertical stabilizers 109*a* and 109*b*, leading edge root extensions 125*a* and 125*b*, and all flying horizontal stabilizer 175 are shown for reference.

Figure 14:
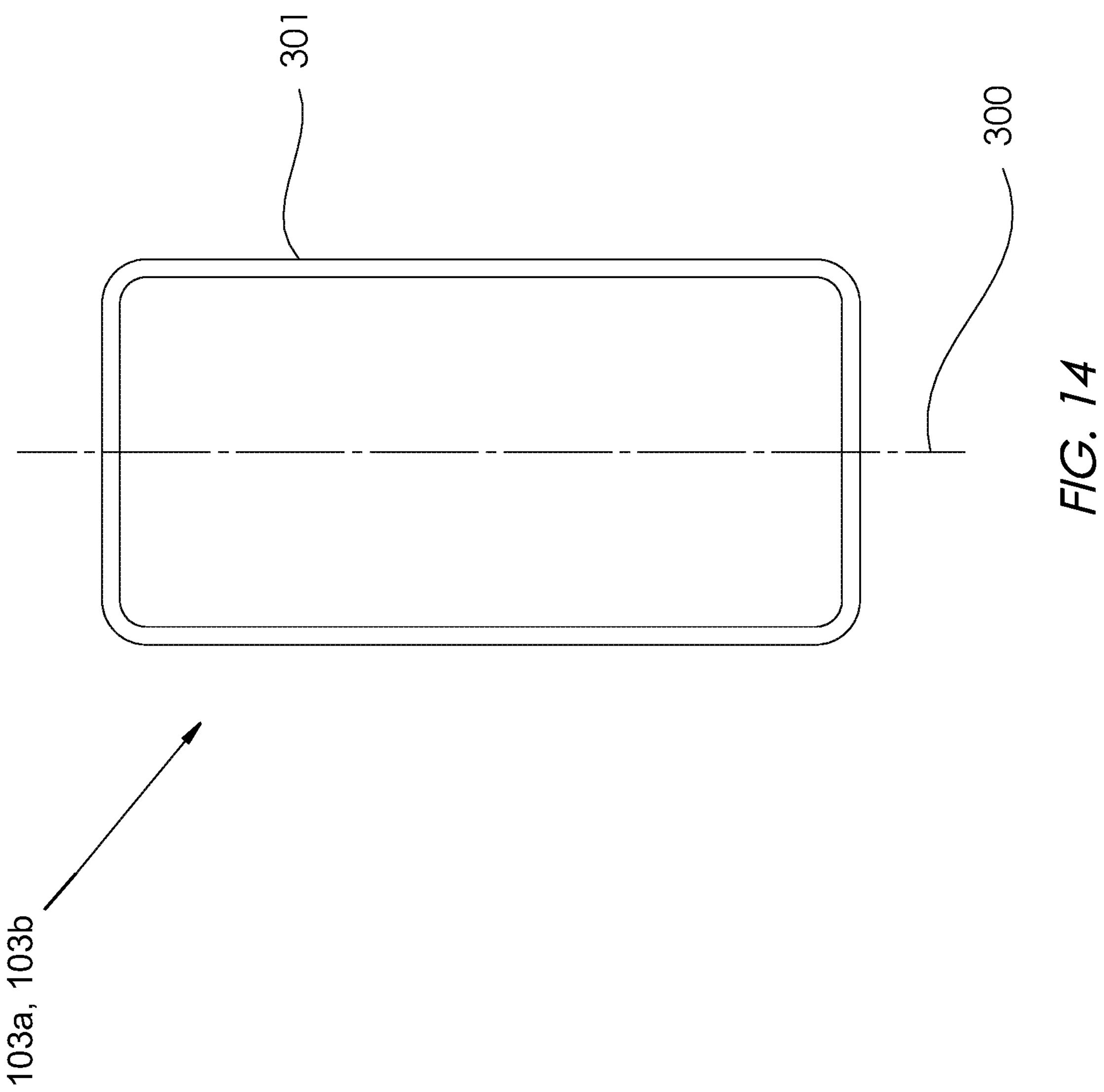
FIG. 14 depicts a cross section of an embodiment of a boom of the invention, showing the symmetrical feature of the boom that allows use of the boom on either the left or right side of the aircraft, resulting in decreased production costs.

Referring now to FIG. 14, booms 103*a* and 103*b* may be symmetrically shaped about boom vertical centerline 300 along the entirety of their length. The outer shape 301 of booms 103*a* and 103*b* may be any shape desired. The boom rectangular cross section depicted in FIG. 14 is intended as exemplary in nature. Booms 103*a* and 103*b* may also be modular in construction and may be of symmetrical cross section so that a left hand boom can be used on the right hand side of the airplane, and vice versa, and both allow for increases in tail volume at higher weights. In an embodiment, booms 103*a* or 103*b* are symmetrical about boom centerline over their length, allowing reduced production costs due to the ability to produce boom 103*a* and boom 103*b* from the same boom design.

Figure 15:
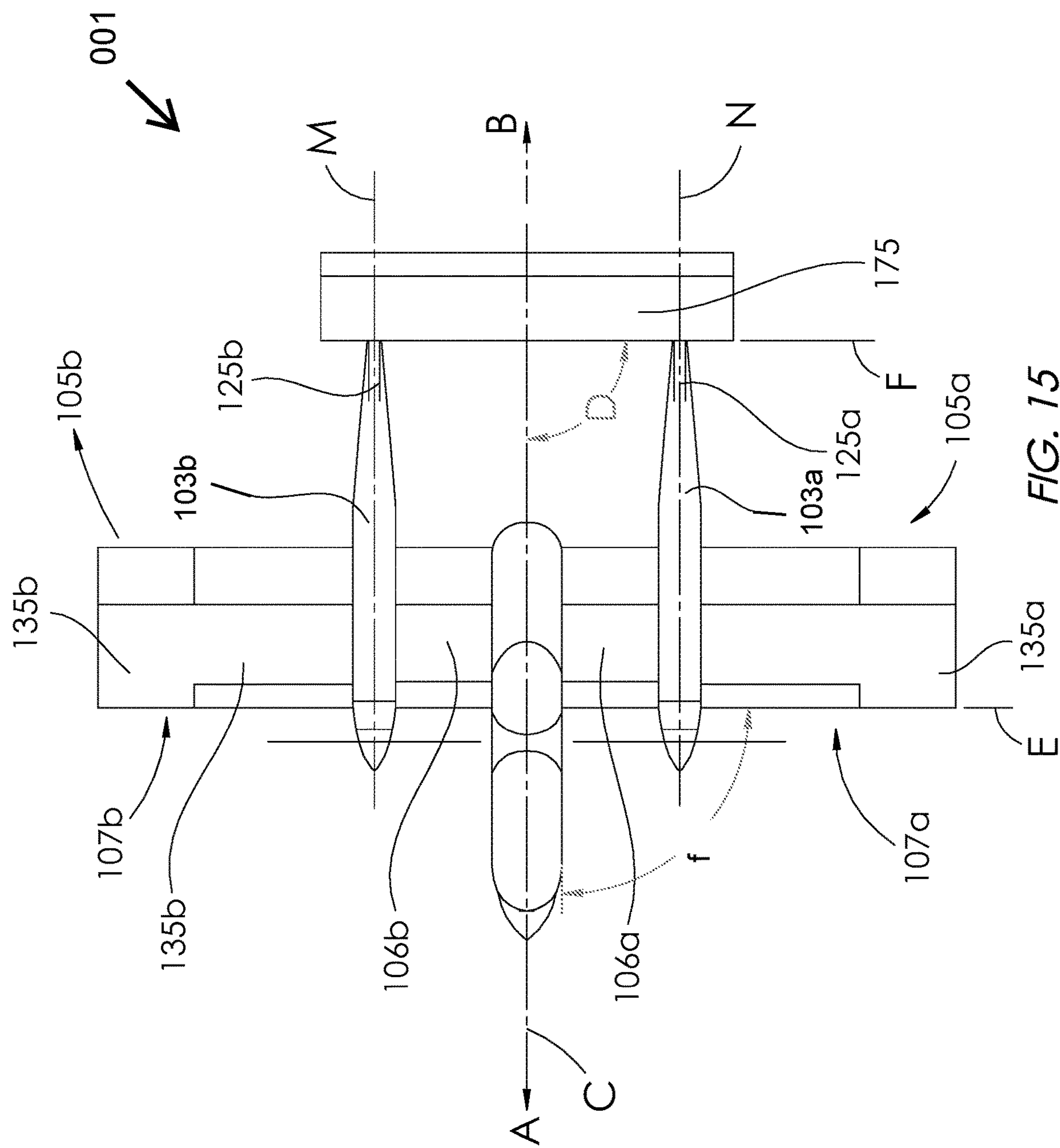
FIG. 15 depicts a plan view of an embodiment of an aircraft of the invention.

Referring now to FIG. 15, a plan view of an embodiment of the aircraft is depicted in which a longitudinal axis C of airplane 001 is depicted. Also called out for reference are wing root sections 106*a* and 106*b*, leading edge root extensions 125*a* and 125*b*, forward, or leading, wing edge line E, forward, or leading, horizontal stabilizer line F, first and second booms 103*a* and 103*b*, outboard wing sections 135*a* and 135*b* and horizontal stabilizer 175. In the embodiment depicted, forward, or leading, wing edge line E is perpendicular to longitudinal axis C of airplane 001, creating a zero plan form sweep wing which is defined by angle f as being 90 degrees. Likewise, forward, or leading, horizontal stabilizer edge line F is perpendicular to longitudinal axis C of airplane 001, creating a zero plan form sweep horizontal stabilizer 175, which is defined by angle D as being 90 degrees. Still further, boom 103*a* may be further defined as having a longitudinal axis N, and boom 103*b* may be defined as having a longitudinal axis M. Axes M and N may be parallel to one another and to aircraft longitudinal axis C, and maybe perpendicular to line E defining the leading edges 107*a* and 107*b* of wings 105*a* and 105*b*. Axes M and N may likewise be perpendicular to line F defining the leading edge of horizontal stabilizer 175. Vertical stabilizer leading edge root extensions 125*a* and 125*b* are shown for reference. Booms 103*a* and 103*b* may be symmetrically disposed about, or in other words equidistant from, aircraft longitudinal axis C. Wing leading edges 107*a* and 107*b* are depicted for reference. Forward direction A and after direction B are also shown for reference.

What is claimed is:

1. A fixed-wing aircraft that is configurable into a low stall speed configuration for short takeoff and landing, and is also configurable into a cruise configuration, having a high cruise speed to stall speed ratio, comprising:

a first fixed wing and a second fixed wing forming an aircraft wingspan, said first and second fixed wings each having a chord line;

a first engine having a first propeller, and a second engine having a second propeller, wherein said first propeller produces a first propeller wash and a first thrust line that is fixed relative to a chord of said first wing, and said second propeller produces a second propeller wash and a second thrust line that is fixed relative to a chord of said second wing;

a first channel for directing said first propeller wash into an extended first retractable flap disposed along a trailing edge of said fixed first wing, and a second channel for directing said second propeller wash into an extended second retractable flap also disposed along a trailing edge of said fixed second wing, when the aircraft is in a low stall speed configuration;

said first channel having a first side formed by a first aircraft surface, a second side formed by a second aircraft surface, a top side formed by a first underneath surface of said first fixed wing, and an open bottom;

said second channel having a first side formed by a third aircraft surface, a second side formed by a fourth aircraft surface, a top side formed by a second underneath surface of said second fixed wing, and an open bottom;

said first channel and said second channel each running a direction of flight of the aircraft, and said first channel and said second channel disposed on opposing sides of a longitudinal centerline of said aircraft;

said first retractable flap able to be extended such that it forms a first angle downward from said wing chord line, and wherein said first retractable flap is a slotted Fowler flap;

said second retractable flap able to be extended such that it forms a second angle downward from said wing chord line, and wherein said second retractable flap is a slotted Fowler flap;

such that, when the aircraft is configured into said low stall speed configuration, the first propeller wash is channeled into the extended first retractable flap by said first channel, deflecting the first propeller wash downward, creating lift and reducing a stall speed of the aircraft, and the second propeller wash is channeled into the extended second retractable flap by said second channel, deflecting the first propeller wash downward, creating lift and reducing said stall speed of the aircraft; and wherein when the aircraft is configured into said cruise configuration, said first retractable flap and said second retractable flap are each retracted;

wherein the aircraft has a first stall speed in said low stall configuration, and a cruise speed in said cruise configuration, wherein said cruise speed to said first stall speed is in a range of 4.00 to 5.74, wherein the aircraft is able to transition from said low-stall speed configuration to said cruise configuration while in flight.

2. The fixed-wing aircraft of claim 1, wherein said first angle and said second angle are in a range of up to eighty-five degrees.

3. The fixed-wing aircraft of claim 1, wherein said first and third aircraft surfaces each comprise a portion of a fuselage of said aircraft.

4. The fixed-wing aircraft of claim 1, wherein said second aircraft surface comprises a portion of a first boom of the aircraft, and wherein fourth aircraft surface comprises a portion of a second boom of the aircraft.

5. The fixed-wing aircraft of claim 1, wherein said first aircraft surface and said third aircraft surface are oriented vertically when the aircraft is level.

6. The fixed-wing aircraft of claim 1, wherein said second aircraft surface and said fourth aircraft surface are each oriented vertically when the aircraft is level.

7. The fixed-wing aircraft of claim 1, wherein said first and second wings are further defined as having a constant chord section.

8. The fixed-wing aircraft of claim 1, wherein said first and second wings have a chord to propeller diameter ratio within the range 0.75 to 1.00.

9. The fixed-wing aircraft of claim 1, further comprising a third retractable flap outboard of said first retractable flap, and a fourth retractable flap outboard of said second retractable flap, and wherein said third and fourth retractable flaps are adapted to be deployed at the same time as said first and second retractable flaps, and at a deployment rate of one half that of said first and second retractable flaps.

10. The fixed-wing aircraft of claim 1, wherein said fixed wing aircraft further comprises third and fourth retractable flaps disposed on said trailing edges of said fixed first wing and said fixed second wing, respectively, wherein said third and fourth retractable flaps are slotted Fowler flaps.

11. The fixed-wing aircraft of claim 1, having an enlarged cross section first channel and an enlarged cross section second channel, each of said enlarged first channel and enlarged second channel operable to channel a larger volume of propeller wash into said first retractable flap and second retractable flap, respectively, comprising:

a first landing gear door disposed on an underneath surface of a first boom, said first landing gear door adapted to form an extended surface of said second surface when open, such that said second side of said first channel comprises the first landing gear door when said first landing gear door is open; and a second landing gear door disposed on an underneath surface of a second boom, said second landing gear door adapted to form an extended surface of said fourth surface when open, such that said second side of said second channel comprises the second landing gear door when said second landing gear door is open.

12. The fixed-wing aircraft of claim 1, having an enlarged cross section first channel and an enlarged cross section second channel, each of said enlarged first channel and enlarged second channel operable to channel a larger volume of propeller wash into said first retractable flap and second retractable flap, respectively, comprising:

a first under-fuselage stores structure surface disposed so as to form an extended surface of said first surface such that a fuselage side of said first channel comprises the first under-fuselage stores structure surface; and a second under-fuselage stores structure surface disposed so as to form an extended surface of said third surface such that a fuselage side of said second channel comprises the second under-fuselage stores structure surface.

* * * * *